G. E. NEUBERTH.
OUTLET BOX.
APPLICATION FILED MAY 13, 1909.

963,802.

Patented July 12, 1910.

2 SHEETS—SHEET 1.

WITNESSES
E. A. Pell
M. A. Johnson

INVENTOR
George E. Neuberth,
BY
Wm. H. Canfield
ATTORNEY

G. E. NEUBERTH.
OUTLET BOX.
APPLICATION FILED MAY 13, 1909.
963,802.
Patented July 12, 1910.
2 SHEETS—SHEET 2.
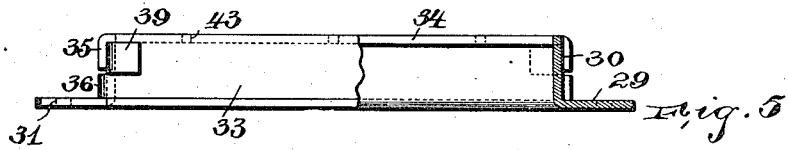
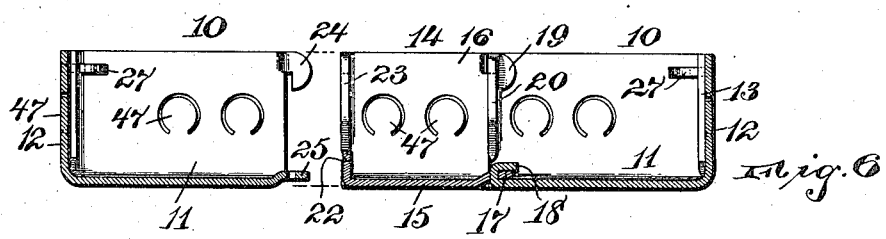
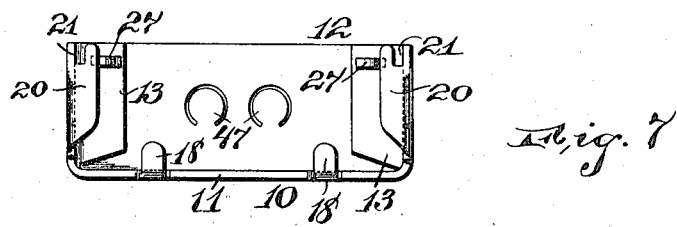
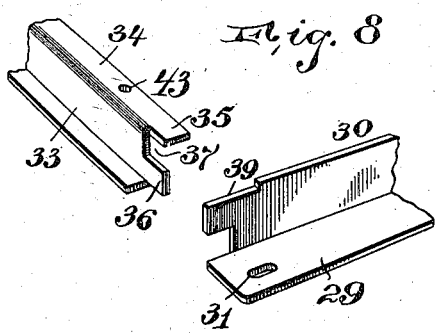
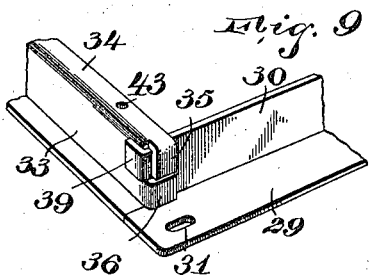
WITNESSES:
E. A. Pell
M. A. Johnson
INVENTOR
George E. Neuberth,
BY
Wm. H. Canfield.
ATTORNEY

UNITED STATES PATENT OFFICE.

GEORGE E. NEUBERTH, OF NEWARK, NEW JERSEY.

OUTLET-BOX.

963,802.  Specification of Letters Patent.  Patented July 12, 1910.

Application filed May 13, 1909. Serial No. 495,710.

*To all whom it may concern:*

Be it known that I, GEORGE E. NEUBERTH, a citizen of the United States, residing at Newark, in the county of Essex and State of New Jersey, have invented certain new and useful Improvements in Outlet-Boxes; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an outlet box which can be used as a single box or it can be built up from sections, the end sections being alike to make the installation of a multiplicity of switches or similar electrical contrivances possible. The intermediate sections are duplicates and can be placed end to end without limit to make the size box desired.

The outlet box is provided with a cover which has end pieces that are alike and are adjustable on the end pieces of the outlet box so that the cover which holds the switches can be alined and leveled without altering the position of the box after it is set in the plaster. The cover is made of end pieces which are duplicates and side pieces, the side pieces being of different lengths according to the number of intermediate sections that are placed in the box proper. The cover and the boxes are designed to be put together without the use of screws, except for the adjustment of the cover on the box. The different sections comprising the box proper and the cover are adapted to be put together by means of overlapping strips and tongues.

The invention is illustrated in the accompanying drawings, in which—

Figure 1:
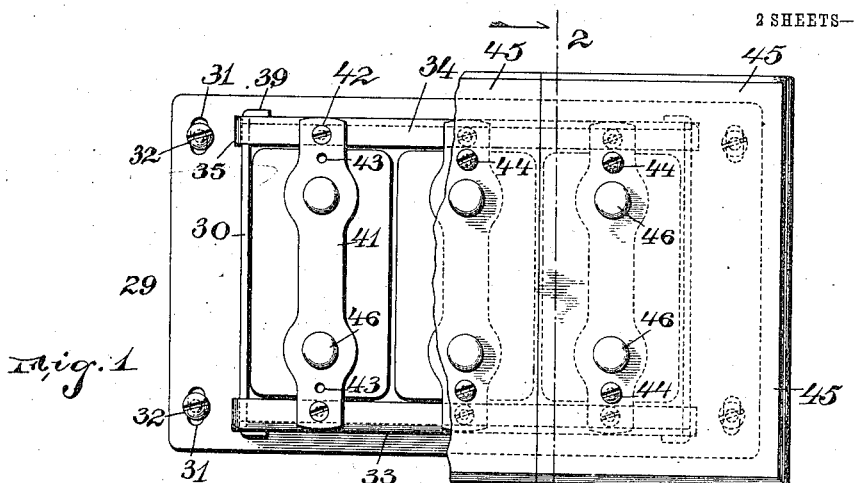
Figures 2, 4:
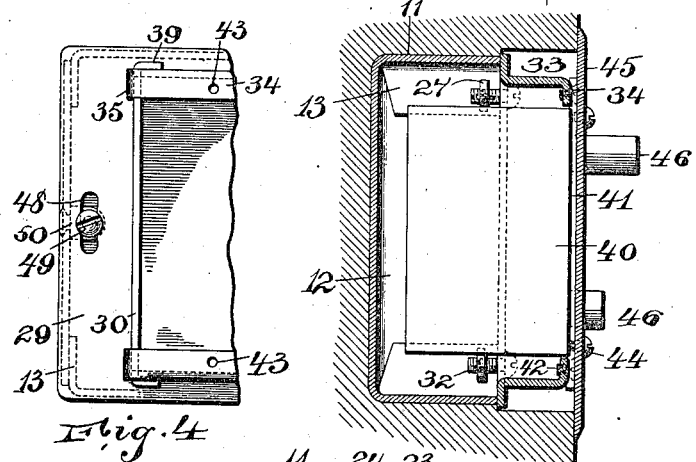
Figure 3:
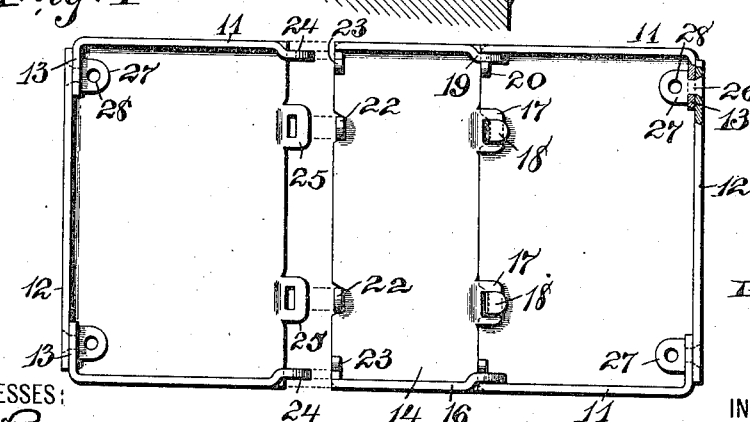

Figure 1 is a face view of an outlet box extended to provide for three switches, the outlet box being covered, for a part of its surface, with a plate that goes on the cover. Fig. 2 is a section on line 2, in Fig. 1. Fig. 3 is a face view of the outlet box comprising three sections, one of the end sections being removed from the intermediate section. Fig. 4 is a detail showing a modified form of securing the cover to the body portion of the box. Figs. 5 and 6 are sections of the body portion of the box and the cover, and Fig. 7 is a view looking into the outlet box with one of the end sections removed. Fig. 8 is a perspective view with the fastening means of the end and the side of the cover separated, and Fig. 9 is a similar view with the parts fastened together.

The body portion of the box comprises two end members 10 which are formed of a strip of sheet metal, each sheet being bent up into side walls 11 and end walls 12, that is, each member has one end wall. The end wall and the side walls are cut so that the side walls are folded over on the end wall as at 13. The intermediate portion 14 consists of a strip of material forming the bottom 15 and the side walls 16, the intermediate portion having, on one end, perforated clips 17 which are adapted to fit over tongues 18, as shown in Fig. 7, which are then bent over, as shown in Fig. 6, to secure the parts together. The edge of the intermediate portion containing the perforated clips 17 has a hook 19 which fits into a projecting bracket 20 having a slot 21 in its top edge to receive the hook. The edge of the intermediate portion opposite the perforated clips is provided with tongues 22, similar to the tongues 18 of the one end member, and also has brackets 23 to receive the hooks 24 on the other end member, the same edge of the other or second end member having the perforated lugs 25 to fit over the tongues 22 to secure the other end section to the intermediate member. The intermediate members are duplicated as often as necessary, and it is thus possible to make a box as long as desired. Each end member 10 has its end wall 12 and the side walls 11, at their overlapping portion, joined by a rivet 26 which is headed to hold the parts together and projects within the end portion, forming a lug 27 which is provided with a screw-threaded perforation 28. The cover consists of two end pieces, each end piece consisting of a flange 29 and an end wall 30, each end piece having a slot 31 to be arranged substantially over one of the lugs 27, and screws 32, passing down through the slots 31 and into the perforations 28 in the lugs 27, hold the end pieces of the cover in their adjusted position. These screws 32 fitting in the lugs 27 and slidable in the slots 31 form the means for adjusting the cover on the body portion. The side pieces of the cover are made up in lengths to suit the different size boxes, according to the number of intermediate members that are used. Each side piece consists of a wall 33 which has the overturned flange 34 at its top edge, the flange 34 extending into a lip 35 and the wall 33 extending into a lip 36 which forms a space 37 to receive a lip 39 on the wall 30 of the end piece of the cover. These lips are turned over, as shown in Fig. 9, to lock the end pieces to the side pieces to form the whole cover, and no other tool but a hammer is necessary for joining the parts, and a workman can make up a cover, on the job on which he is working, by simply having the component parts of different lengths joined to make up a complete cover. The slotted portions of the cover, with the screw adjustment, are provided so that the switches, which are suspended from the cover, can be alined when the cover is alined, the cover being arranged to be set straight, even if the box is slightly out of plumb and being plastered in place in a tilted position cannot very readily be changed.

Through the adjustment between the cover and the body portion of the box the plates covering the whole structure, which plates form a finish and are attached to the cover, can be made to set level on the wall. Each switch 40 is of any ordinary type and is made, as shown, with the strip 41 which is fastened by means of the screws 42 in the holes 43 provided in the top flange 34 of the side pieces of the cover. The strip 41 of the switches is provided with perforations 43 into which pass the screws 44, the screws 44 holding in place the finishing plates 45, which finishing plates are provided with perforations through which the push buttons 46 are adapted to project.

It will be seen from this structure that the cover, the switches and the finishing plates are secured together, and when the cover is adjusted and the plates are put on, then, if the cover is level, the plates will be level and a good finished job is the result. Suitable knock-out pieces 47 can be suitably disposed in the body portion of the box to provide for conduits or wires. If necessary the adjustment of the cover can be made through a single slot 48 which is placed in the center of each end piece of the cover and is adapted to receive a screw 49 which passes into a suitable lug 50, placed within the end member of the body portion as will be seen from Fig. 4.

Having thus described my invention, what I claim is:—

1. An outlet box comprising a body portion made up of sections adapted to be placed side by side, a cover consisting of end members and side strips, the end members and side strips having walls, the side strips having top flanges, the flanges and walls having lips on their ends adapted to be bent over to secure the parts together, means on the top flanges for securing switches thereto, and means for securing the cover to the body portion.

2. An outlet box comprising a series of members detachably secured together, a cover consisting of end members and side strips detachably secured together, means for securing switches to the cover, and means for securing the cover to the body portion so that it can be tilted and fastened in its different tilted positions.

3. An outlet box comprising a series of members adapted to be placed side by side, the end members consisting of three sides and a bottom, the juncture of the sides being provided with overlapping portions, studs passing through the overlapping portions to secure them together and projecting inwardly, the studs having screw-threaded perforations, a cover having slots therein, and screws adapted to pass through the slots and the perforated studs.

4. An outlet box comprising end members, each end member having an open side, one end member on the open side having recessed brackets and tongues, the second end member having hooks to engage the brackets and perforated lugs to receive the tongues, intermediate sections having one edge provided with recessed brackets and tongues and having their other edge provided with hooks and perforated lugs so that the end members and the intermediate members can be secured side by side, a cover consisting of end members and side strips, the side strips having means for securing switches thereto, the side strips and end members of the cover having lips on their abutting corners, the lips on one element being adapted to be bent over on the other element, and means for securing the cover to the end members of the body portion.

5. In an outlet box, a cover comprising end members, each end member consisting of a flange and a wall, and side strips, each side strip comprising a wall and a top flange, the flanges and walls of the side strips and the walls of the end members of the cover having lips on their ends adapted to be bent over to secure the parts together.

In testimony, that I claim the foregoing, I have hereunto set my hand this 11th day of May 1909.

GEORGE E. NEUBERTH.

Witnesses:
E. A. PELL,
WM. H. CAMFIELD.